Patented Nov. 13, 1951

2,575,010

UNITED STATES PATENT OFFICE 2,575,010

DICHLOROMALONALDEHYDATES

Marian F. Fegley, Mont Clare, and Willard J. Croxall, Bryn Athyn, Pa., assignors to Rohm & Haas Company, Philadelphia, Pa., a corporation of Delaware No Drawing. Application August 19, 1949, Serial No. 111,334

4 Claims. (Cl. 260—483)

This invention deals with alkyl dichloromalonaldehydates,

wherein R is an alkyl group of not over four carbon atoms. It provides a method by which these compounds may be prepared from alkyl β-alkoxyacrylates.

The alkyl β-alkoxyacrylates are available through the reaction of acetylene on dialkyl carbonates in the presence of an anhydrous strongly basic catalyst. This reaction is fully described in application, Serial No. 52,607, filed October 2, 1948 (now Pat. No. 2,535,012) by Croxall and Schneider. Acetylene is run into an alkyl carbonate at 20° to 110° C. in the presence of a catalyst, the catalyst is destroyed, and the reaction products which include alkyl β-alkoxyacrylates and alkyl β,β-dialkoxypropionates are separated. Typical carbonates are dimethyl carbonate, diethyl carbonate, dipropyl carbonate, diisopropyl carbonate, dibutyl carbonate, diisobutyl carbonate, and sec.-butyl carbonate. Typical catalysts are alkali metal acetylides, including sodium acetylide, potassium acetylide, or disodium acetylide, alkali metal alcoholates, including sodium methylate, ethylate, or butoxide, and quaternary ammonium alkoxides, such as benzyl trimethyl ammonium methoxide, dibenzyl dimethyl ammonium ethoxide, or benzyl trimethyl ammonium tert.-butoxide.

From the reaction mixture there are obtained non-tertiary alkyl β,β-dialkoxypropionates, alkyl β-alkoxyacrylates, dialkyl dialkoxysuccinates, and dialkyl alkoxymaleates. The first two are readily collected in one fraction and while they may then be separated, this step is not essential. The alkyl β,β-dialkoxypropionates, whether alone or in admixture with alkoxyacrylate, are converted to corresponding β-alkoxyacrylates when heated with a dealcoholating catalyst, and one mole of alcohol is taken off per mole of dialkoxypropionate. This process is more fully described in application, Serial No. 52,608, filed by Croxall and Schneider on October 2, 1948, now Pat. No. 2,571,212. This process makes readily available methyl β-methoxyacrylate, ethyl β-ethoxyacrylate, propyl β-propoxyacrylate, or butyl β-butoxyacrylate, and the like.

The reaction between any one of these or an equivalent alkyl β-alkoxyacrylate and hypochlorous acid solution is carried out below 20° C. and preferably between 0° and 10° C. The hypochlorous acid is best used in aqueous solution at a concentration from one per cent to five per cent, although both weaker and somewhat stronger solutions may be used. Hypochlorous acid solution is added in excess and the resulting reaction product is then separated.

A convenient method for effecting the isolation of the alkyl dichloromalonaldehydate is through salting out and separation of brine and organic layer. The organic layer may be purified by distillation.

To illustrate the various procedural steps which have been described, there will now be given examples which are typical of practical methods finally yielding the alkyl α,α-dichloromalonaldehydates of this invention.

A. PREPARATION OF DIETHER PROPIONATES AND ETHER ACRYLATES

Example 1

In an apparatus having a gas-tight, stainless-steel stirrer, there was placed 225 grams of anhydrous ethyl alcohol. Small cubes of sodium were gradually added thereto in an amount of 30 grams. The sodium was dissolved with the formation of sodium ethylate. Excess alcohol was distilled off under reduced pressure. To the sodium ethylate there were added 2200 grams of diethyl carbonate. The reaction vessel was then equipped with gas inlet and outlet tubes, manometer, and thermometer. It was flushed with nitrogen and heated to 80° C. Acetylene was passed in until the rate of absorption became very slow. The vessel and contents were cooled and the flow of acetylene discontinued. Dilute acetic acid was added to destroy the catalyst. Two layers formed. The upper oily layer was separated and fractionally distilled.

A forerun taken at atmospheric pressure consisted of ethyl alcohol and ethyl carbonate. Distillation was continued under reduced pressure. A fraction distilling at 65°–75° C./2–4 mm. consisted of 10% of ethyl β-ethoxyacrylate and 90% of ethyl β,β-diethoxypropionate. At 75° C./4 mm., a fraction of pure ethyl β,β-diethoxypropionate was obtained. Between 75° C./4 mm. and 114° C./3mm., a mixture of ethyl β,β-diethoxypropionate and diethyl α,α-diethoxysuccinate was take off. At 114°–115° C./3–4 mm., there was obtained a fraction consisting of diethyl α,α-diethoxysuccinate. On further distillation, a fraction containing this ether succinate and diethyl α-ethoxymaleate was obtained.

In the same way other esters of carbonic acid and monohydric alcohols may be reacted with acetylene to give ether acrylates and propionates as above. Other alkaline catalysts may be used in place of sodium ethylate in amounts from 0.01% to 5% of the weight of the carbonate. Typical esters thus available are methyl β-methoxyacrylate, methyl β,β-dimethoxypropionate, propyl β-propoxyacrylate, propyl β,β-dipropoxypropionate, isopropyl β-isopropoxyacrylate, butyl β-butoxyacrylate, butyl β,β-dibutoxypropionate, isobutyl β-isobutoxyacrylate, etc.

B. CONVERSION OF ALKYL β,β-DIALKOXYPROPIONATES TO ALKYL β-ALKOXYACRYLATES

Example 2

A mixture of 192 grams of ethyl β,β-diethoxypropionate and one gram of sodium acid sulfate was placed in a reaction vessel equipped with a short packed column and slowly heated. At about 80° C., there began to be evolved vapors of ethyl alcohol. Heating was continued with distillation of the alcohol. Pot temperatures advanced to 150° C. with the overhead temperatures of 78.5° C. to 80° C. A total of 44.5 grams of ethyl alcohol was taken off. Heating was continued and at 85.5°–86.5° C./19 mm., a main fraction was taken which was ethyl β-ethoxyacrylate.

Example 3

In accordance with the method of Example 2, a mixture of 96 grams of n-butyl β,β-di(n-butoxy)propionate and 0.25 gram of sodium acid sulfate was heated. At batch temperatures of 110°–160° C., there was evolved n-butanol with overhead temperatures of 110° to 114° C. The batch temperature was carried to 180° C. At 110°–111° C./3 mm., there was obtained the main fraction which consisted of butyl β-butoxyacrylate.

Example 4

The above procedure was applied to a charge of 954 grams of methyl β,β-dimethoxypropionate and 0.1 gram of sodium acid sulfate. There were obtained 185 grams of methanol and 650 grams of methyl β-methoxyacrylate.

The dealcoholating catalysts include both strongly acidic and basic materials, such as potassium acid sulfate, p-toluene sulfonic acid, sulfuric acid, boric acid, zinc chloride, sulfonated cation exchange resins in their hydrogen form, alkali metal alcoholates, alkaline earth alcoholates, etc., amounts of 0.01% to 1% by weight being generally sufficient.

C. REACTION OF ALKYL β-ALKOXYACRYLATES AND HYPOCHLOROUS ACID

Example 5

In a reaction vessel equipped with stirrer, thermometer, dropping funnel, and reflux condenser was placed 58 parts by weight of methyl β-methoxyacrylate. This material was stirred and cooled by means of an ice bath. A freshly prepared 5% hypochlorous acid solution was slowly run into the reaction vessel until a definite excess was present. This state was tested for by removal of a small sample of solution and addition of an acidified potassium iodide solution to it. With an excess of hypochlorous acid present, stirring was continued for a half hour. Sodium chloride was then added to the reaction mixture. An oil separated and was taken off. It was dried over sodium sulfate and distilled. A fraction which corresponded to methyl α,α-dichloromalonaldehydate was taken off at 70°–75° C./30 mm.

Example 6

A charge of 72 parts by weight of ethyl β-ethoxyacrylate was placed in the reaction vessel and chilled to 0° C. A five per cent hypochlorous acid solution was slowly added until 2000 parts had been used. Stirring was continued for 15 minutes and the product was then salted out. It was collected as an oil, dried over sodium sulfate, and distilled. At 79°–80° C./19 mm., a fraction of 31 parts was collected. It corresponded in composition to ethyl α,α-dichloromalonaldehydate. It had a refractive index, $n_D^{20}$, of 1.4460, a density of 1.324, and a saponification number of 625 (theory 605).

Example 7

In the same way 50 parts of butyl β-butoxyacrylate was reacted at 0°–15° C. with hypochlorous acid in about a 5% aqueous solution, about 1000 parts of this solution being necessary. The reaction product was separated as an oil and purified by distillation at 115°–123° C./30 mm. It corresponded in composition to that of butyl α,α-dichloromalonaldehydate.

As an alternative method for preparing the alkyl dichloromalonaldehydates, the alkyl β-alkoxyacrylates are converted to alkyl α-chloro-β-alkoxyacrylates which are then reacted with hypochlorous acid. The alkyl α-chloro-β-alkoxyacrylates are prepared by the method described in our Application Serial No. 111,331, filed on even date, now U. S. Patent 2,526,007, issued October 17, 1950. Chlorine is run into an alkyl β-alkoxyacrylate at —5° C. to 20° C. to form an addition product which is then heated with resulting dehydrochlorination to yield the desired alkyl α-chloro-β-alkoxyacrylate.

Typical examples of this preparation follow.

Example 8

(a) There were mixed in a reaction vessel equipped with stirrer, reflux condenser, and gas inlet tube 216 parts by weight of ethyl β-ethoxyacrylate and 200 parts of chloroform. This mixture was cooled by use of a salted ice bath. Chlorine gas was bubbled through the mixture while it was kept below 10° C. When an excess of chlorine had been added as shown by development of a yellow color, the passage of chlorine was discontinued. Excess chlorine and part of the chloroform were removed under reduced pressure while the reaction mixture was gently warmed. The product was ethyl α,β-dichloro-β-ethoxypropionate in chloroform solution.

(b) A mixture of 178.5 parts of ethyl β-ethoxyacrylate and 250 parts of chloroform was reacted with chlorine as in (a) above. Excess chlorine and chloroform were taken off by heating. Hydrogen chloride was evolved and the material in the reaction vessel was heated to 150°–160° C. for two hours. It was then fractionally distilled. A forerun of a small amount of ethyl β-ethoxyacrylate was obtained at 95°–150° C./61 mm. At 150°–155° C./61 mm., there was distilled ethyl α-chloro-β-ethoxyacrylate. It has a refractive index, $n_D^{20}$, of 1.4728. By analysis the product obtained contained 20.11% of chlorine. The theoretical chlorine content for ethyl-α-chloro-β-ethoxyacrylate is 19.85%. The yield was 92%.

Example 9

Ethyl α,β-dichloro-β-ethoxypropionate was prepared as in Example 8 (a) above. It was run very slowly into a mixture of 1.35 gram moles of triethylamine in 400 ml. of ethyl ether until 1.28 gram moles of the ether ester had been added. Triethylamine hydrochloride was formed and was separated by filtration. The ether was distilled off and the resulting material filtered to remove additional triethylamine hydrochloride which had separated. It was then distilled at 78°–80° C./1 mm. to give a 78% yield of ethyl α-chloro-β-ethoxyacrylate.

*Example 10*

(a) A solution of 116 parts by weight of methyl β-methoxyacrylate in 250 parts of chloroform was cooled to 10° C. and treated with chlorine gas as in Example 8 (a). The temperature of the reaction mixture was kept between 2° and 10° C. by use of an ice-salt bath. As soon as a yellow color developed, excess chlorine was taken off along with most of the chloroform by stripping under reduced pressure. The product thus obtained was methyl α,β-dichloro-β-methoxypropionate.

(b) A portion of this product was heated at 170° C. for 1.5 hours. Hydrogen chloride was taken off as it was evolved. The heated product was then fractionally distilled. A forerun of methyl β-methoxyacrylate was taken off at 95°–124° C./28 mm. At 124°–128° C./28 mm., a fraction was distilled which corresponded in composition to that of methyl α-chloro-β-methoxyacrylate. The redistilled product boiled at 124°–125° C./28 mm. and had a refractive index, $n_D^{20}$, of 1.4838.

*Example 11*

(a) A mixture of 31.5 parts of butyl β-butoxyacrylate in 75 parts of chloroform was cooled to 5° C. and chlorine passed therethrough while the temperature was kept between 0° and 8° C. by means of an ice-salt bath. The chloroform was distilled from the reaction mixture and the resulting material heated at 160°–180° C. for an hour. It was then distilled at low pressure. After a forerun of butyl β-butoxyacrylate, there was obtained a fraction of 18 parts which distilled at 135°–146° C./4 mm. and corresponded in composition to butyl α-chloro-β-butoxyacrylate.

(b) A mixture of 89 parts of ethyl α-chloro-β-ethoxyacrylate, 112 parts of normal butyl alcohol, and 2 parts of p-toluene sulfonic acid was heated in a reaction vessel equipped with a packed distilling column topped with partial take-off head. Ethanol was distilled from the reaction mixture. When it was no longer obtained, the temperature was raised and butanol was taken off. The mixture was then subjected to fractional distillation at reduced pressure. A forerun of eight parts distilling at 90°–122° C./4 mm. consisted of mixed ethyl α-chloro-β-ethoxyacrylate and butyl α-chloro-β-butoxyacrylate. At 122°–145° C./4 mm., there was obtained butyl α-chloro-β-butaxyacrylate in an amount of 65 parts. This material was redistilled at 142°–144° C./4 mm. to give a very pure product, which had a refractive index of 1.4674 and which contained by analysis 14.75% of chlorine (theory 14.76%).

The above example shows how the ether acrylates can be transetherified and transesterified as a means of passing from a lower ester to a higher. It should also be mentioned that by use of a mild dealcoholating catalyst, such as sodium acid sulfate, a smaller ether group may be replaced with a larger one without changing the ester group. Thus, ethyl β-ethoxyacrylate is heated with butyl alcohol to yield ethyl β-butoxyacrylate or with octyl alcohol to yield ethyl β-octoxyacrylate. As shown above, the α-chloro-β-alkoxyacrylates similarly undergo ether and ester interchange. The same reactions can be effected with the β-chloro-α-alkoxymaleates.

The compounds thus prepared have the general formula

ROCH=CClCOOR

These are reacted with hypochlorous acid in the same way as the alkyl β-alkoxyacrylates and the same end products obtained. The following example is sufficient to illustrate this method.

*Example 12*

To 65 parts by weight of ethyl α-chloro-β-ethoxyacrylate, cooled to 0°–5° C., there was added with stirring about 600 parts of a hypochlorous acid solution. Tests with potassium iodide solution showed that excess hypochlorous acid had been added. The reaction mixture was treated with salt. An oil separated and was removed. It was dried over sodium sulfate and distilled. A fraction of 12 parts was obtained at 75°–81° C./19–20 mm. which had a refractive index of 1.4454 and was ethyl α,α-dichloromalonaldehydate.

The compounds of this invention are very versatile chemical intermediates, since they possess three kinds of reactive groups. They react, for example, with amines having available hydrogen. They undergo reactions with hydrazine. The chlorine atoms are replaceable with hydrogen.

We claim:

1. A process for preparing a non-tertiary alkyl α,α-dichloromalonaldehydate which comprises reacting an alkyl β-alkoxyacrylate in which the alkyl group contains not over four carbon atoms with a dilute solution of hypochlorous acid at a temperature between —5° C. and 20° C.

2. The process of claim 1 in which the alkyl β-alkoxyacrylate is ethyl β-ethoxyacrylate.

3. The process of claim 1 in which the alkyl β-alkoxyacrylate is methyl β-methoxyacrylate.

4. The process of claim 1 in which the alkyl β-alkoxyacrylate is butyl β-butoxyacrylate.

MARIAN F. FEGLEY.
WILLARD J. CROXALL.

REFERENCES CITED

The following references are of record in the file of this patent:

UNITED STATES PATENTS

| Number | Name | Date |
|---|---|---|
| 2,405,820 | Faith | Aug. 13, 1946 |